United States Patent
Park et al.

(10) Patent No.: US 9,758,330 B2
(45) Date of Patent: Sep. 12, 2017

(54) BILL ALIGNING APPARATUS

(71) Applicant: Nautilus Hyosung Inc., Seoul (KR)

(72) Inventors: Jong Seong Park, Gyeonggi-do (KR);
Jun Young Kim, Gyeonggi-do (KR);
Chang Ho Park, Gyeonggi-do (KR);
Young Chul Lee, Gyeonggi-do (KR);
Jin Young Hwang, Seoul (KR)

(73) Assignee: NAUTILUS HYOSUNG INC. (KR)

( * ) Notice: Subject to any disclaimer, the term of this patent is extended or adjusted under 35 U.S.C. 154(b) by 0 days.

(21) Appl. No.: 14/931,038

(22) Filed: Nov. 3, 2015

(65) Prior Publication Data
US 2016/0052738 A1    Feb. 25, 2016

Related U.S. Application Data

(63) Continuation of application No. PCT/KR2013/011623, filed on Dec. 16, 2013.

(30) Foreign Application Priority Data

May 10, 2013    (KR) .................. 10-2013-0053036
May 10, 2013    (KR) .................. 10-2013-0053037

(51) Int. Cl.
   *B65H 9/02*    (2006.01)
   *B65H 9/00*    (2006.01)
   (Continued)

(52) U.S. Cl.
   CPC .............. *B65H 9/002* (2013.01); *B65H 5/06* (2013.01); *B65H 7/06* (2013.01); *B65H 9/106* (2013.01);
   (Continued)

(58) Field of Classification Search
   CPC . B65H 9/00; B65H 9/002; B65H 9/20; B65H 2404/12; B65H 2404/121; B65H 2404/122; G07D 11/0027
   See application file for complete search history.

(56) References Cited

U.S. PATENT DOCUMENTS 3,645,379 A * 2/1972 Kornylak ............... B65G 13/07
                                                 193/37
4,669,718 A * 6/1987 Rovin .................... B65H 9/002
                                                 226/21
(Continued)

FOREIGN PATENT DOCUMENTS

JP        61273449      12/1986
JP         9194081       7/1997
KR      19860009362     12/1986

*Primary Examiner* — Jeremy R Severson
(74) *Attorney, Agent, or Firm* — Bacon & Thomas, PLLC

(57) ABSTRACT

Disclosed herein is an apparatus for aligning a bill supplied to a transfer path with a center line of the transfer path. The apparatus may include: a first centering roller arranged at one side of the transfer path and applying a frictional force to a portion of the bill positioned at one side of the transfer path so that the bill is moved to the center line, the first centering roller having a first driven wheel formed in a border part to face one edge line of the transfer path; and a second centering roller arranged at the other side of the transfer path and applying a frictional force to another portion of the bill positioned at the other side of the transfer path so that the bill is moved to the center line, the second centering roller having a second driven wheel formed in a border part to face the other edge line of the transfer path.

11 Claims, 9 Drawing Sheets

(51) Int. Cl.
  G07D 11/00    (2006.01)
  B65H 5/06     (2006.01)
  B65H 9/10     (2006.01)
  B65H 7/06     (2006.01)
  B65H 9/20     (2006.01)

(52) U.S. Cl.
  CPC ........... B65H 9/20 (2013.01); G07D 11/0027 (2013.01); *B65H 2404/12* (2013.01); *B65H 2701/1912* (2013.01)

(56) References Cited

U.S. PATENT DOCUMENTS

| | | | | |
|---|---|---|---|---|
| 4,715,460 | A * | 12/1987 | Smith | A61G 5/046 |
| | | | | 180/210 |
| 5,465,953 | A * | 11/1995 | Takemoto | B65H 9/002 |
| | | | | 271/234 |
| 6,059,284 | A * | 5/2000 | Wolf | B65H 5/062 |
| | | | | 271/227 |
| 7,950,518 | B2 * | 5/2011 | Fehrenbach | B65H 9/002 |
| | | | | 198/411 |
| 8,978,879 | B2 * | 3/2015 | Fourney | B65G 39/04 |
| | | | | 193/35 MD |
| 9,156,642 | B2 * | 10/2015 | Dunham | G03G 15/6582 |
| 9,193,533 | B2 * | 11/2015 | Fourney | B65G 39/04 |
| 2013/0334770 | A1 * | 12/2013 | Fehrenbach | B65H 5/062 |
| | | | | 271/228 |
| 2016/0101958 | A1 * | 4/2016 | Park | B65H 9/002 |
| | | | | 271/234 |

* cited by examiner

BILL ALIGNING APPARATUS

TECHNICAL FIELD

The present invention relates generally to apparatuses for aligning bills and, more particularly, to a bill alignment apparatus that can successively transfer and align bills supplied onto a transfer path.

BACKGROUND ART

Generally, different kinds of banking ATMs (automated teller machines) have come into wide use in banks. Among the banking ATMs, bill receiving and processing machines receive bills, for example, an individual bill or check, and automatically process the bills or checks.

For instance, when a customer or a teller puts bills into a receiving port of a bill receiving and processing machine, each of the supplied bills is transferred along a transfer path formed in the bill receiving and processing machine and aligned with one side of the transfer path. Thereafter, after the authenticity of each bill is verified, when the bill is normal, the bill is finally received and processed. If the bill is abnormal, the reception of the bill is rejected and it is discharged.

Here, in the case where the bills are aligned with one side of the transfer path, the distance that each bill must be moved on the transfer path may be excessively long depending on the position at which the bill is placed on the transfer path.

To avoid the above problem, a technique of aligning a bill with a center line of the transfer path to reduce the time it takes to move the bill and minimize displacement of the bill is required.

DISCLOSURE

Technical Problem

It is, therefore, an object of the present invention to provide an apparatus for aligning a bill that can successively transfer and align bills supplied onto a transfer path, thereby improving the ability to align the bill on the transfer path.

Technical Solution

In accordance with a preferred embodiment of the present invention, there is provided an apparatus for aligning a bill supplied onto a transfer path with a center line of the transfer path, the apparatus including: a first centering roller arranged at one side of the transfer path and applying a frictional force to a portion of the bill positioned at one side of the transfer path so that the bill is moved to the center line, the first centering roller having a first driven wheel formed in a border part to face one edge line of the transfer path; and a second centering roller arranged at the other side of the transfer path and applying a frictional force to another portion of the bill positioned at the other side of the transfer path so that the bill is moved to the center line, the second centering roller having a second driven wheel formed in a border part to face the other edge line of the transfer path.

Advantageous Effects

According to certain embodiments of the present invention, since rollers having two-directional properties are applied, a bill supplied onto a transfer path can be successively transferred and aligned, thereby improving operational reliability of the apparatus.

Furthermore, according to certain embodiments of the present invention, while the bill is transferred along the transfer path, a separate time to align the bill with the center line of the transfer path is not required. Therefore, the apparatus in accordance with the present invention can rapidly and effectively align the bill with the center line.

In addition, according to certain embodiments of the present invention, since a position of the bill can be precisely controlled on the transfer path, the bill can be prevented from twisting or wrinkling.

MODE FOR INVENTION

Hereinafter, the construction, coupling relationship and operational principle of preferred embodiments of the present invention will be described in detail with reference to the accompanying drawings. If in the specification, detailed descriptions of well-known functions or configurations would unnecessarily obfuscate the gist of the present invention, the detailed descriptions will be omitted. The terms and words used for elements in the description of the present invention have been determined in consideration of the functions of the elements in the present invention. The terms and words may be changed depending on the intention or custom of users or operators, so that they must be defined based on the whole content of the specification of the present invention.

The preferred embodiment of the present invention will be explained in detail with reference to the attached drawings.

First Embodiment

Although a bill alignment apparatus according to the first embodiment will be described as aligning a bill with a center line C of a transfer path 10 to obtain precise information from the bill 20 supplied to a transfer path 10 or to efficiently control the bill 20, the present invention is not limited to this structure. For example, bills 20 may be aligned with one side of the transfer path depending on design conditions of the apparatus or design conditions of peripheral devices of the apparatus.

Figure 1:
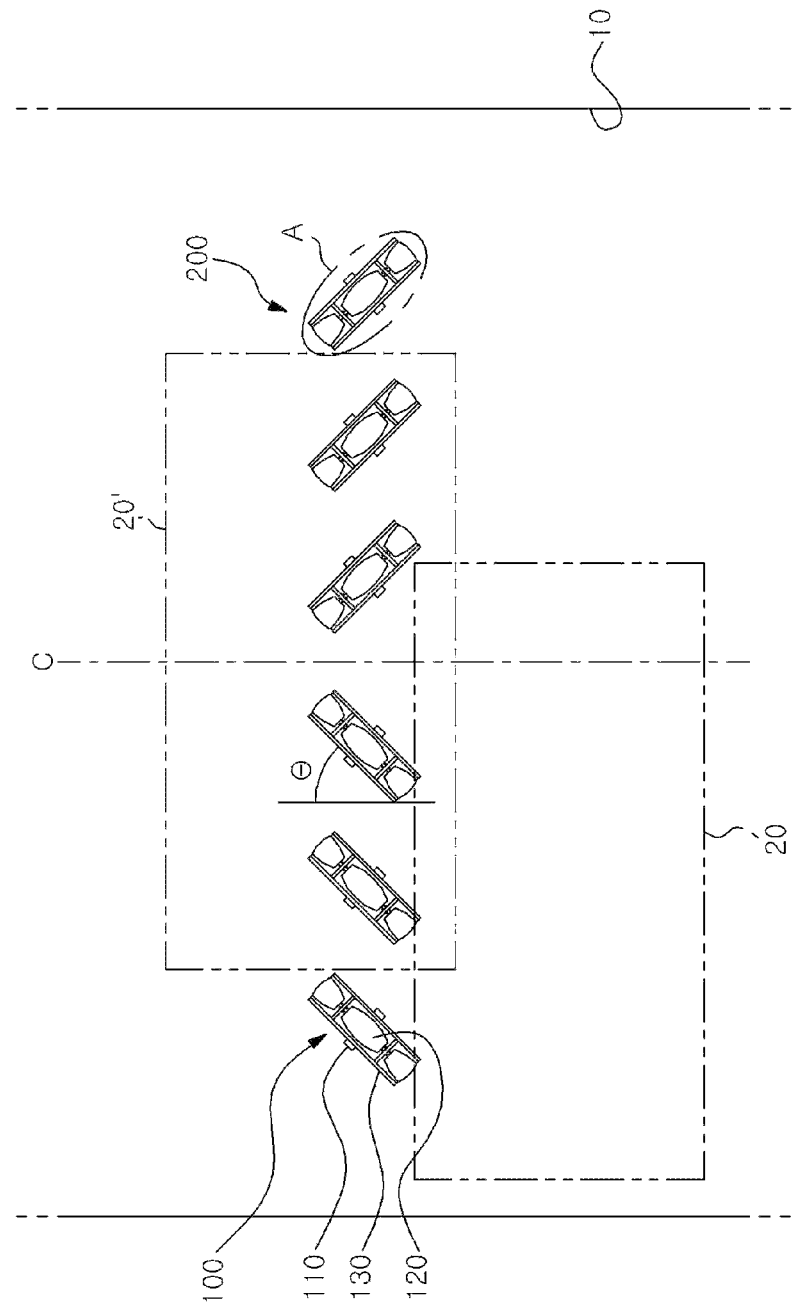
FIG. 1 is a plan view illustrating a bill alignment apparatus, in accordance with a first embodiment of the present invention.
Figure 2:
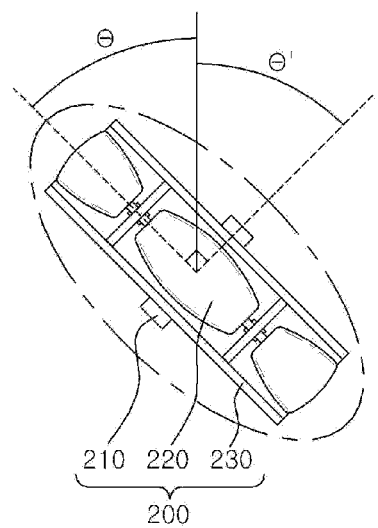
FIG. 2 is an enlarged view enlarging and showing portion "A" of FIG. 1.

FIG. 1 is a plan view illustrating the bill alignment apparatus in accordance with the first embodiment of the present invention, and FIG. 2 is an enlarged view enlarging and illustrating portion "A" of FIG. 1.

As shown in FIGS. 1 and 2, the bill alignment apparatus in accordance with the first embodiment includes a first centering roller 100, a second centering roller 200, a bill position sensor 300 and a controller (not shown). The forms of driven wheels illustrated in the drawings are schematically illustrated for convenience of the description.

In detail, the first centering roller 100 may be arranged at one side of the transfer path 10 to be inclined towards the center line C and may provide a driving force for moving the bill 20 positioned at one side of the transfer path 10 in a direction of the center line C of the transfer path 10. Here, the direction of the center line C of the transfer path 10 may be defined as a direction at which the bill 20 positioned at the one side or the other side of the transfer path 10 is disposed to be inclined towards the center line C of the transfer path 10.

The first centering roller 100 may be configured so that the bill 20 supplied onto the transfer path 10 can be guided in a direction inclined towards the center line C. For example, in order to move the bill 20 in the direction of the center line C of the transfer path 10, the first centering roller 100 may include: a first rotating shaft rotatably mounted to a support frame (not shown) of the transfer path 10; a first driven wheel 120 rotatably formed to face one edge line of the transfer path 10; and a first roller body 130 to which the first rotating shaft 100 and the first driven wheel 120 are mounted.

The first centering roller 100 may be configured such that a plurality of first centering rollers is arranged at the one side of the transfer path 10 to be spaced apart from each other in a width direction of the transfer path 10. For example, three first centering rollers 100 may be positioned at the one side of the transfer path 10. Accordingly, the bill 20 positioned at the one side of the transfer path 10 may be moved in the direction of the center line C of the transfer path 10 by rotation of the three first centering rollers 100. This movement of the bill 20 may be maintained until a rotational force of the first centering rollers 100 and a rotational force of the second centering rollers form the balance of power. Here, the first driven wheel 120 may correct a traveling direction of the bill 20 for enabling smooth movement of the bill 20 when a force (frictional force) is applied to the bill 20 by the second centering rollers 200.

In the present embodiment, for convenience of the description, even though it has been illustrated that the first centering rollers 100 are spaced apart from each other by a distance L, in order to successively provide a force to the bill using the first centering rollers 100, the distance between the plurality of first centering rollers 100 may be designed in a range of at least 0 or below. For example, the plurality of first centering rollers 100 may be arranged such that at least one portion of the first centering roller 100 overlaps with the adjacent first centering roller in a transfer direction of the bill, and the plurality of second centering rollers 200, which will be described later, may be also arranged such that at least one portion of the second centering roller overlaps with the adjacent second centering roller in the transfer direction of the bill.

Moreover, the first driven wheel 120 of the first centering roller 100 may be composed of a rugby ball-shaped roller and may be configured such that a plurality of first driven wheels 120 is arranged in a row along a border part of the first roller body 130. However, the shape or arrangement structure of the first driven wheel 120 may be variously changed.

For example, the first driven wheel 120 may be composed of a circular roller and may be configured such that the plurality of first driven wheels 120 is arranged in two rows along the border part of the first roller body 130. Of course, the shape or arrangement structure of the second driven wheel 220, which will be described later, may be also variously changed as those of the first driven wheel 120.

The second centering roller 200 is arranged at the other side of the transfer path 10 to be inclined towards the center line C and provide a driving force for moving the bill 20 in the direction of the center line C of the transfer path.

To do so, the second centering roller 200 may include: a second rotating shaft 219 rotatably mounted to the support frame of the transfer path 10 and moving the bill 20 in the direction of the center line C of the transfer path 10; a second driven wheel 220 rotatably formed to face the other edge line of the transfer path 10; and a second roller body 230 to which the second rotating shaft 210 and the second driven wheel 220 are mounted.

The second centering roller 200 may be configured such that a plurality of second centering rollers is arranged at the other side of the transfer path 10 to be spaced apart from each other in a width direction of the transfer path 10. For example, three second centering rollers 200 may be positioned at the other side of the transfer path 10. Accordingly, the bill 20 positioned at the other side of the transfer path 10 may be moved in the direction of the center line C of the transfer path 10 by rotation of the three second centering rollers 200. This movement of the bill 20 may be maintained until a rotational force of the first centering rollers 100 and a rotational force of the second centering rollers form a balance of power. At this time, the second driven wheel 220 may correct a traveling direction of the bill 20 for enabling smooth movement of the bill 20 when a force (frictional force) is applied to the bill 20 by the first centering rollers 100.

An inclination angle θ between the first centering roller 100 or the second centering roller 200 and the center line C may range from 30° to 60°, and an inclination angle θ' between the first driven wheel 120 or the second driven wheel 220 and the center line C may satisfy a complementary angle of the inclination angle θ between the first centering roller 100 or the second centering roller 200 and the center line C. In the present embodiment, when the inclination angle θ between the first centering roller 100 or the second centering roller 200 and the center line C is maintained at 45°, the inclination angle θ' between the first driven wheel 120 or the second driven wheel 220 and the center line C may be maintained at 45°.

As such, when the first centering roller 100 and the second centering roller 120 come into contact with the bill 20, they move the bill in the direction of the center line C while moving the bill in the transfer direction. Thus, the magnitude of force may be determined depending upon the number of the centering rollers in contact with the bill 20, and at this time, the bill 20 may be moved to the center line C of the transfer path 10 using the imbalance of force.

Second Embodiment

The general construction of a bill alignment apparatus according to the second embodiment of the present invention, other than the fact that the first centering rollers 100 and second centering rollers 200 are arranged in lines and rows on the transfer path, is the same as that of the bill alignment apparatus according to the first embodiment. Therefore, the same or similar reference numerals will be used to designate elements equal to or corresponding to those of FIG. 1, and further explanation of these elements will be omitted.

Figure 3:
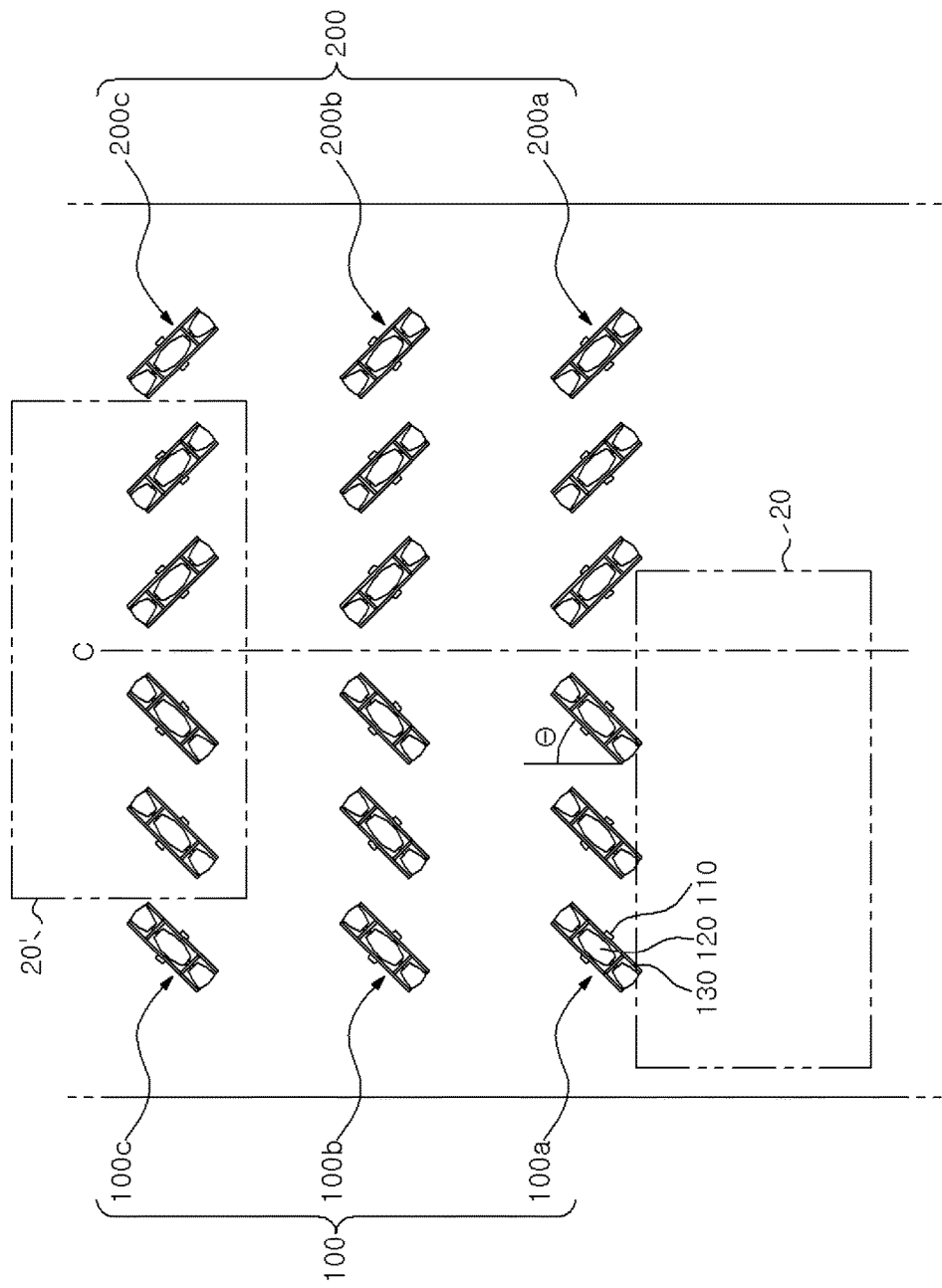
FIG. 3 is a plan view illustrating a bill alignment apparatus, in accordance with a second embodiment of the present invention.

FIG. 3 is a plan view illustrating the bill alignment apparatus, in accordance with the second embodiment of the present invention.

As shown in FIG. 3, the bill alignment apparatus in accordance with the second embodiment may include a plurality of first centering rollers 100 and a plurality of second centering rollers 200 that are arranged in lines and rows on the transfer path 10.

When the first centering rollers 100 and the second centering rollers 200 are arranged to be symmetrically inclined based on a center line C while making lines and rows, the bill 20 may be gradually move in a direction of the center line C of the transfer path 10 while being moved along the transfer path 10.

In the present embodiment, although the first centering rollers 100a, 100b, 100c and the second centering rollers 200a, 200b, 200c are arranged at one side and the other side of the center line C, respectively, in an arrangement structure in a 3×3 form, the present invention is not limited thereto. If an arrangement structure allows the bill 20 being moved along the transfer path 10 to be gradually moved in the direction of the center line C, the first centering rollers 100 and the second centering rollers 200 may be variously arranged on the transfer path 10.

Figure 4:
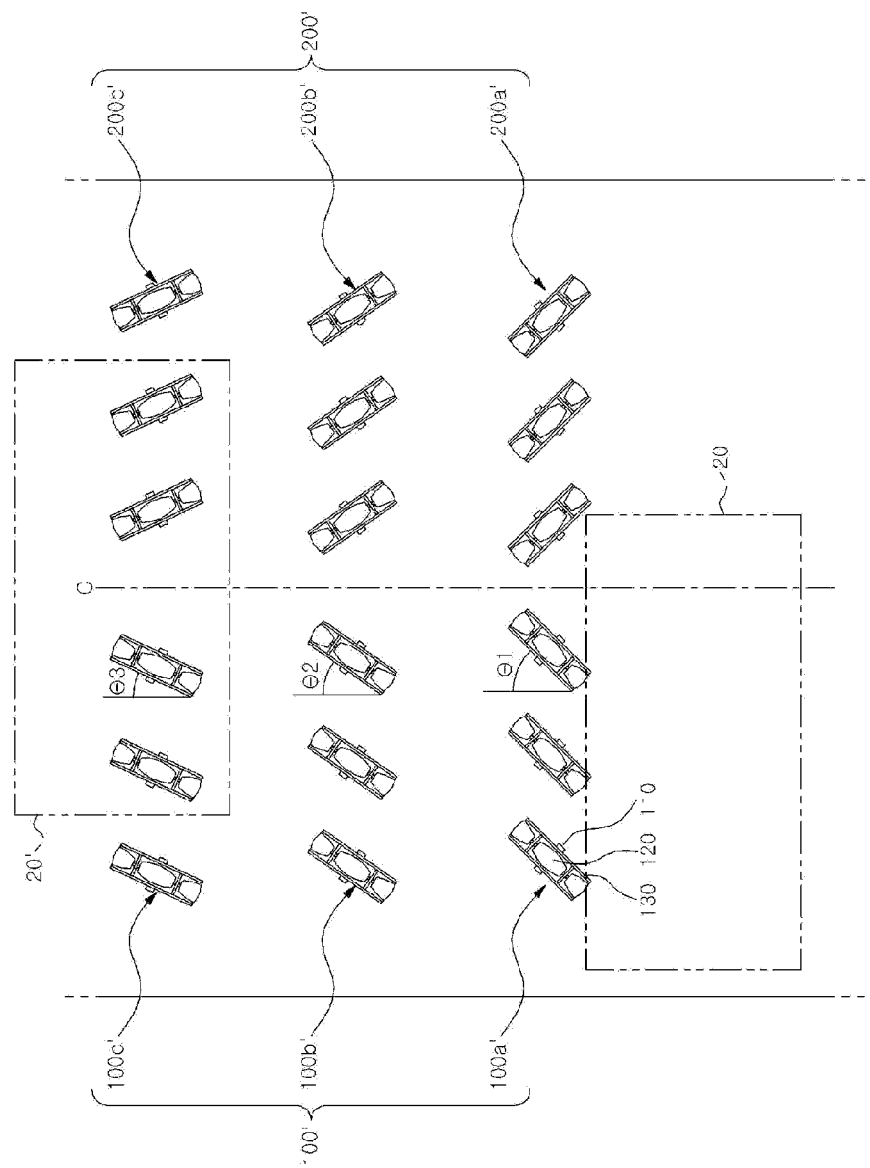
FIG. 4 is a plan view illustrating a bill alignment apparatus according to a modified example of the second embodiment.

FIG. 4 is a plan view illustrating a bill alignment apparatus according to a modified example of the second embodiment.

As shown in FIG. 4, in the bill alignment apparatus according to the modified example of the second embodiment, an inclination angle θ between the first centering roller 100' or the second centering roller 200' and the center line C may gradually reduce from an alignment entrance side of the transfer path to an alignment exit side.

For example, when the first centering roller 100' and the second centering roller 200' are arranged at one side and the other side of the center line C, respectively, in an arrangement structure in a 3×3 form, an inclination angle θ2 between the first centering roller 100b' or the second centering roller 200b' positioned in a second row and the center line may be smaller than an inclination angle θ1 between the first centering roller 100a' or the second centering roller 200a' positioned in a first row and the center line, and an inclination angle θ3 between the first centering roller 100c' or the second centering roller 200c' positioned in a third row and the center line may be smaller than the inclination angle θ2 between the first centering roller 100b' or the second centering roller 200b' positioned in the second row and the center line.

Thus, as the bill 20 entered onto the transfer path 10 is gradually moved to the first centering rollers 100b', 100c' and the second centering rollers 200b', 200c' positioned in the second row and the third row through the first centering roller 100a' and the second centering roller 200a' positioned in the first row, the bill becomes closer to the center line C of the transfer path 10 so as to more precisely approach the center line C.

Figure 5:
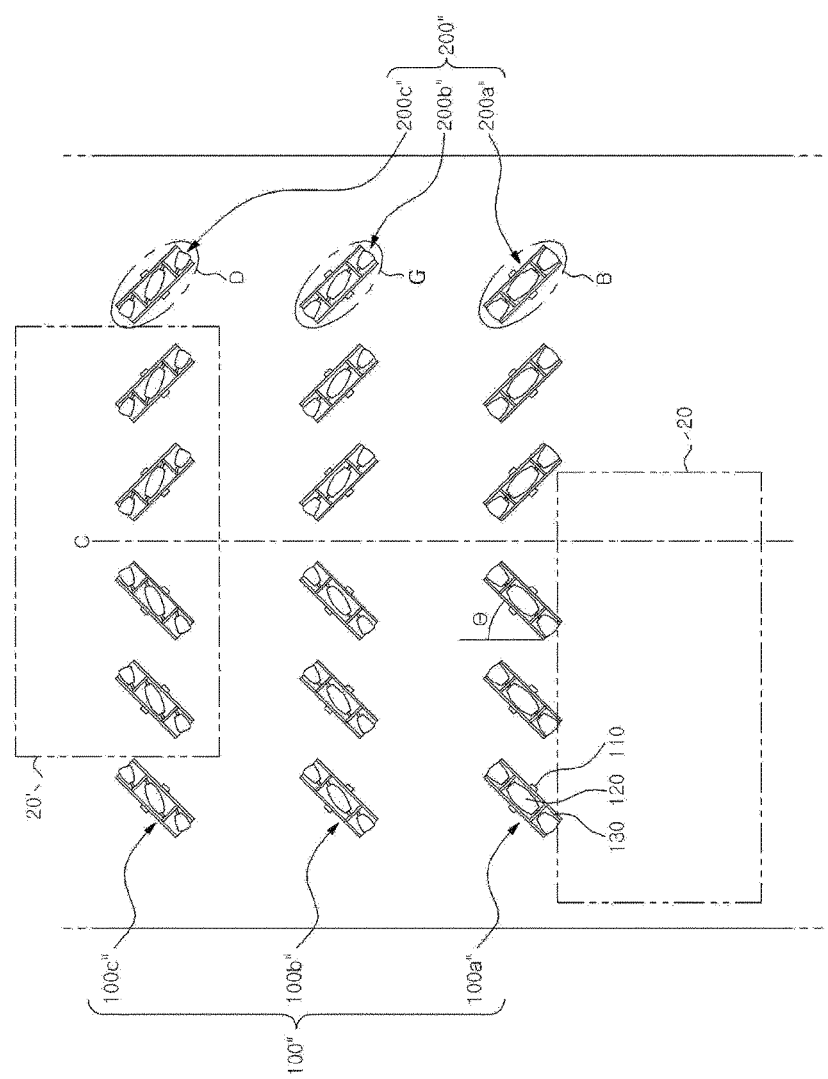
FIG. 5 is a plan view illustrating a bill alignment apparatus according to another modified example of the second embodiment.
Figure 6:
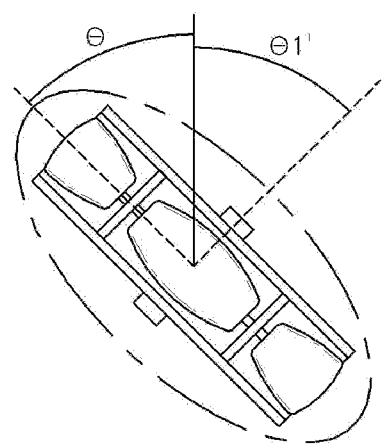
FIG. 6 is an enlarged view enlarging and showing portion "B" of FIG. 5.
Figure 7:
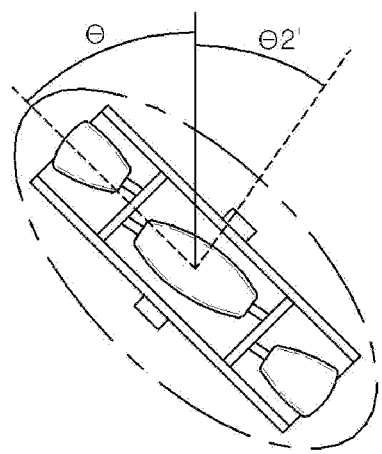
FIG. 7 is an enlarged view enlarging and showing portion "G" of FIG. 5.
Figure 8:
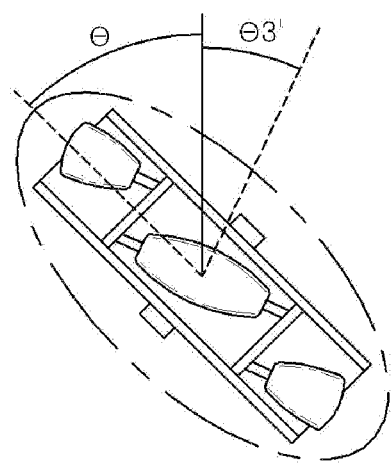
FIG. 8 is an enlarged view enlarging and showing portion "D" of FIG. 5.

FIG. 5 is a plan view illustrating a bill alignment apparatus according to another modified example of the second embodiment, FIG. 6 is an enlarged view enlarging and showing portion "B" of FIG. 5, FIG. 7 is an enlarged view enlarging and showing portion "G" of FIG. 5, and FIG. 8 is an enlarged view enlarging and showing portion "D" of FIG. 5.

As shown in FIGS. 5 to 8, according to said another modified example of the third second embodiment, an inclination angle θ' between the first driven wheel or the second driven wheel 220 and the center line C may gradually reduce from the alignment entrance side of the transfer path 10 to the alignment exit side.

As shown in FIGS. 5 to 8, according to the other modified example of the third embodiment, an inclination angle θ ' between the first driven wheel or the second driven wheel 220 and the center line C may gradually reduce from the alignment entrance side of the transfer path 10 to the alignment exit side.

For example, when the first centering roller 100" and the second centering roller 200" are arranged at one side and the other side of the center line C, respectively, in an arrangement structure in a 3×3 form, an inclination angle θ2' between the first driven wheel 120 or the second driven wheel 220 positioned in the second row and the center line C may be smaller than an inclination angle θ1' between the first driven wheel 120 or the second driven wheel 220 positioned in the first row and the center line C, and an inclination angle θ3 between the first driven wheel 120 or the second driven wheel 220 positioned in the third row and the center line C may be smaller than the inclination angle θ2' between the first driven wheel 120 or the second driven wheel 220 positioned in the second row and the center line C.

Thus, as the bill 20 entered onto the transfer path 10 is gradually moved to the first centering rollers 100b", 100c" and the second centering rollers 200b", 200c" positioned in the second row and the third row through the first centering roller 100a" and the second centering roller 200a" positioned in the first row, the bill becomes closer to the center line C of the transfer path 10 so as to more precisely approach the center line C.

Third Embodiment

The general construction of a bill alignment apparatus according to the third embodiment of the present invention, other than the fact that an operation of the first centering roller 100 and an operation of the second centering roller 200 are controlled by sensing a position of the bill on the transfer path 10, is the same as that of the bill alignment apparatus according to the first embodiment. Therefore, the same or similar reference numerals will be used to designate elements equal to or corresponding to those of FIG. 1, for example, the first centering roller 100 and the second centering roller 200, and further explanation of these elements will be omitted.

Figure 9:
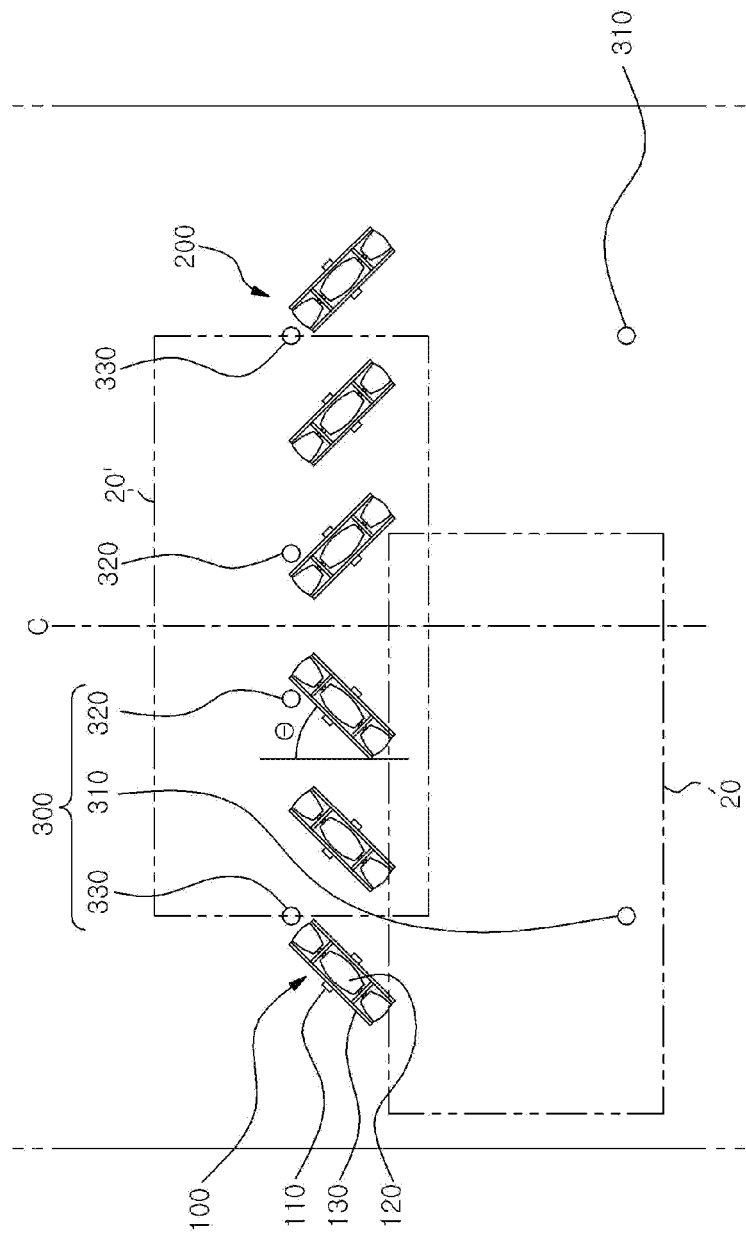
FIG. 9 is a plan view illustrating a bill alignment apparatus, in accordance with a third embodiment of the present invention.

FIG. 9 is a plan view illustrating the bill alignment apparatus, in accordance with the third embodiment of the present invention.

As shown in FIG. 9, the bill alignment apparatus may include the first centering roller 100, the second centering roller 200, the bill position sensor 300 and the controller (not shown).

In detail, the bill position sensor 300 senses a position of the bill 20 moving to the transfer path 10, thereby providing position information of the bill 20 to the controller. The bill position sensor 300 may include an entrance position sensor 310, an exit position sensor 320 and an alignment position sensor 330.

Here, the entrance position sensor 310 is disposed in a location at which alignment of the bill 20 begins. When the bill 20 reaches the location at which the alignment of the bill 20 being moved along the transfer path 10 begins, the entrance position sensor may sense the bill 20 of the corresponding location and may then provide alignment entrance position information to the controller. The exit position sensor 320 is located on the transfer path 10 corresponding to a location at which the alignment of the bill ends. When the bill 20 on the transfer path 10 reaches the location at which the alignment of the bill ends, the exit position sensor may sense the bill 20 of the corresponding location and may then provide alignment exit position information to the controller. The alignment position sensor 330 may be configured such that the alignment position sensors are positioned at opposite sides of the center line C to be spaced apart from each other. When the bill 20 reach a location at which opposite ends of the bill is aligned in a width direction of the transfer path 10, the alignment position sensor may sense the bill 20 and may then provide alignment position information in the width direction to the controller.

In the present embodiment, although the bill position sensor 300 senses the locations at which the alignment of the bill 20 begins and ends, and the location at which movement of the bill 20 in the width direction is finished, the present invention is not limited to this. In order to sense an accurate position of the bill 20 on the transfer path 10, the bill position sensor 300 may be arranged on the transfer path in various forms or may be changed in various constructions.

The controller may receive position information of the bill 20 provided from the bill position sensor 300 and may control the operation of the first centering roller and the operation of the second centering roller 200 so that the bill 20 is aligned with the center line C of the transfer path 10.

For example, the controller applies successive operation signals to the first centering roller 100 and the second centering roller 200, thereby rotating the first centering roller 100 and the second centering roller 200 so that the first and second centering rollers are linked with each other. The bill 20 positioned at one side or the other side of the transfer path 10 is moved diagonally towards the center line C from the transfer path 10 by rotation of the first centering roller 100 and the second centering roller 200. Then, the bill may be positioned in the center line of the transfer path 10 corresponding to a location at which the balance of power is realized between the first centering roller 100 and the second centering roller 200.

In particular, the controller may change a rotational speed of the first centering roller 100 or the second centering roller 200 depending upon a position or condition of the bill 20 on the transfer path, thereby controlling the bill 20 from twisting or skewing.

As described above, in the present invention, a bill that has been supplied onto a transfer path can be continuously transferred and aligned so that operation reliability of the apparatus can be improved. Further, since a separate time to align the bill with the transfer path is not required, the apparatus in accordance with the present invention can rapidly and effectively align the bill with a center line. In addition, since the position of the bill can be precisely controlled on the transfer path, the bill can be prevented from twisting or wrinkling.

What is claimed is:

1. An apparatus for aligning a bill supplied onto a transfer path with a center line of the transfer path, the apparatus comprising:

a first centering roller arranged at one side of the transfer path to be inclined towards the center line and applying a frictional force to a portion of the bill positioned at one side of the transfer path so that the bill is moved to the center line, the first centering roller having a first driven wheel formed in a border part to face one edge line of the transfer path; and a second centering roller arranged at the other side of the transfer path to be inclined towards the center line and applying a frictional force to another portion of the bill positioned at the other side of the transfer path so that the bill is moved to the center line, the second centering roller having a second driven wheel formed in a border part to face the other edge line of the transfer path, wherein the first driven wheel is configured to rotate in a direction different from a rotation direction of the first centering roller, and wherein the second driven wheel is configured to rotate in a direction different from a rotation direction of the second centering roller.

2. The apparatus of claim 1, wherein the first centering roller and the second centering roller are configured such that a plurality of first centering rollers and a plurality of second centering rollers are arranged in a direction vertical to the transfer direction of the bill.

3. The apparatus of claim 2, wherein the first centering rollers and the second centering rollers are arranged to cause a difference in frictional forces applied to the one portion and the other portion of the bill when a center of the bill is weighted towards one side or the other side of the center line.

4. The apparatus of claim 2, wherein the first centering rollers provided in plural number are arranged such that at least one portion of the first centering roller overlaps with an adjacent first centering rollers in the transfer direction of the bill, and the second centering rollers provided in plural number are arranged such that at least one portion of the second centering roller overlaps with an adjacent second centering roller in the transfer direction of the bill.

5. The apparatus of claim 1, wherein an inclination angle ($\theta'$) between the first driven wheel or the second driven wheel and the center line satisfies a complementary angle of an inclination angle ($\theta$) between the first centering roller or the second centering roller and the center line C.

6. The apparatus of claim 1, wherein the inclination angle ($\theta'$) between the first driven wheel or the second driven wheel and the center line reduces gradually from an alignment entrance side of the transfer path to an alignment exit side.

7. An apparatus for aligning a bill supplied onto a transfer path with a center line of the transfer path, the apparatus comprising:

a first centering roller arranged on the transfer path to be inclined towards the center line and having a first driven wheel formed in a border part to face one edge line of the transfer path; and a second centering roller arranged on the transfer path to be inclined towards the center line so as to be symmetric to the first centering roller and having a second driven wheel formed in a border part to face the other edge line of the transfer path, wherein the first driven wheel is configured to rotate in a direction different from a rotation direction of the first centering roller, and wherein the second driven wheel is configured to rotate in a direction different from a rotation direction of the second centering roller.

8. The apparatus of claim 7, wherein the first centering roller comprises:
- a first rotating shaft adopted to provide a rotational force for moving the bill from one side of the transfer path to the center line;
- a first roller body having a central part in which the first rotating shaft is disposed, and a border part in which the first driven wheel is rotatably installed,
- wherein the first driven wheel is adopted to correct a traveling direction of the bill when a force is applied to the bill by the second centering roller.

9. The apparatus of claim 7, wherein the second centering roller comprises:
- a second rotating shaft adopted to provide a rotational force for moving the bill from the other side of the transfer path to the center line;
- a second roller body having a central part in which the second rotating shaft is disposed, and a border part in which the second driven wheel is rotatably installed,
- wherein the second driven wheel is adopted to correct a traveling direction of the bill when a force is applied to the bill by the first centering roller.

10. The apparatus of claim 7, further comprising:
- a bill position sensor sensing a position of the bill being moved along the transfer path and providing position information of the bill; and
- a controller controlling an operation of the first centering roller and an operation of the second centering roller according to the position information of the bill so that the bill is aligned with the center line of the transfer path.

11. The apparatus of claim 10, wherein the bill position sensor comprises:
- an entrance position sensor providing information about an alignment entrance of the transfer path at which alignment of the bill begins;
- an exit position sensor providing information about an alignment exit of the transfer path at which alignment of the bill is completed; and
- an alignment position sensor providing width position information of the bill aligned with the center line.

* * * * *